Jan. 16, 1951  J. H. PALMER  2,538,650
TOASTER SLICE POSITIONER
Filed Oct. 22, 1948

Inventor:
John H. Palmer,
by Sheridan W. Biggs
His Attorney.

Patented Jan. 16, 1951

2,538,650

UNITED STATES PATENT OFFICE 2,538,650

TOASTER SLICE POSITIONER

John H. Palmer, Milford, Conn., assignor to General Electric Company, a corporation of New York Application October 22, 1948, Serial No. 55,883

1 Claim. (Cl. 99—391)

My invention relates to cooking or heating appliances such as toasters, and more particularly to a device or mechanism for automatically shifting a slice to a desired position within a toaster and for holding the slice in position during the toasting operation. This device or mechanism for shifting or holding the slice may be called a slice positioner. While I will show and describe the invention in connection with a toaster of the automatic type, it is obvious that the invention could be employed in manually operated toasters.

A popular construction for toasters includes a vertically sliding slice carrier or carriage which operates between an upward position in which the slice of bread or other material is projected through a slot in the casing of the toaster, and a downward position in which the slice rests between opposed heating elements for the purpose of being toasted. For best results in such a toaster, the slice should be free to move with the carriage during the carriage movements to upward and downward positions. However, the slice should also be properly positioned with respect to the heating elements and other toaster parts during the toasting cycle. This desired operation has been difficult to accomplish in the past, mainly because the toasted material may stick on the slice guides or the slice positioner and because the thickness of slices being toasted may vary.

Among the objects of my invention therefore is the provision of a slice positioner in the form of a slice shifting and holding mechanism which will leave the slices free to move with the carriage, and which will properly position a slice within the toaster, regardless of possible sticking of the slice or of variation in the thickness of slices. Other objects are to keep such a mechanism simple, inexpensive, and free from interference with the other parts of the toaster, all without making major alterations to the other portions of conventional toaster designs.

The principal objects of my invention are accomplished by mounting the slice positioner on the moving slice carriage to move with it, and by providing a resilient actuator for the positioner which will permit variable operation of the positioner to accommodate slices of different thickness.

Other objects and the details of that which I believe to be novel and my invention will be clear from the following description and claims taken with the accompanying drawing in which an example of a toaster is shown embodying the present invention and incorporating my novel slice positioner.

Figure 1:
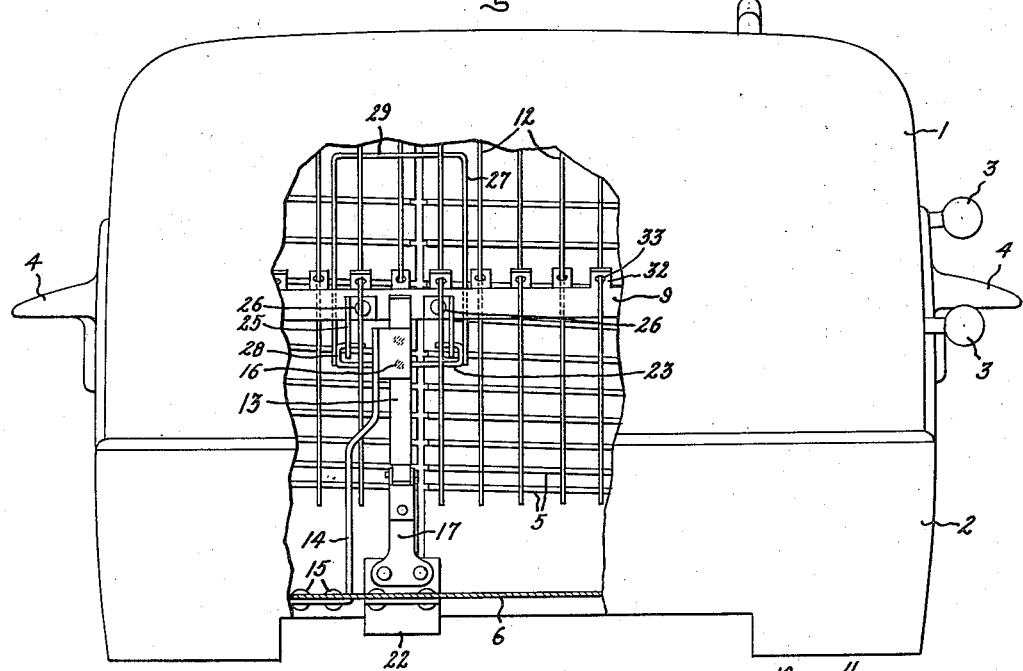
Figure 2:
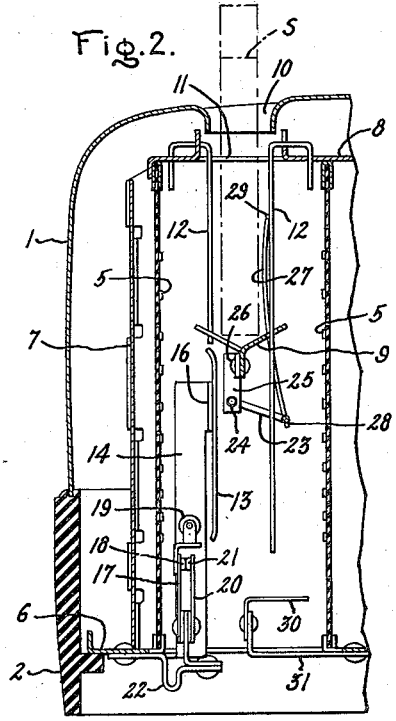
Figure 3:
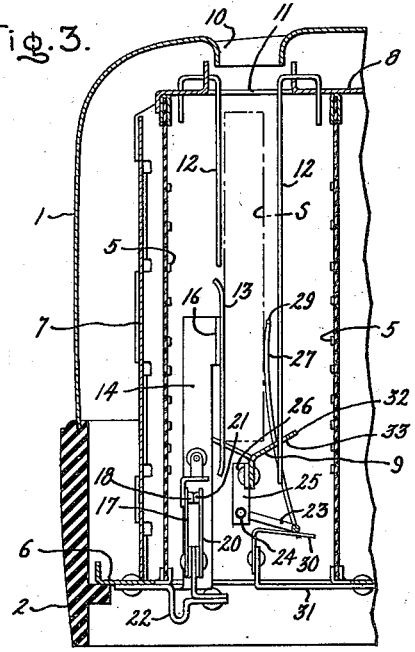

In the drawing Fig. 1 is a side elevation of a toaster incorporating my invention, certain parts being broken away for clarity; Fig. 2 is a cross section of the toaster of Fig. 1 showing the parts in their non-toasting position, and Fig. 3 is a view similar to Fig. 2 but showing the parts in their toasting position.

As is usual, the toaster includes an outer casing or shell 1 with a base 2 and any desired number and character of knobs 3 or handles 4 for the proper manipulation and control of the toaster. Also, the toaster includes the customary heating or toasting elements 5 suitably carried within the casing as by a toaster frame which includes a bottom wall 6, side walls 7 and a top wall 8. The slices, S, of bread or other material to be toasted are carried on a carrier 9 which is mounted in any suitable fashion so that it may slide between an upward position wherein the bread is pushed or projected through a slot 10 in the casing, and a downward position wherein the bread is located between the opposed heating elements 5. Of course, the upper wall of the toaster frame is provided with a slot 11 corresponding to the slot 10 in the casing so that the bread or other material may be introduced to or removed from the carriage.

In the toaster shown, there are also provided a series of vertical guide wires 12 which assist in the general positioning of a slice with respect to the heaters. These guides may be suitably secured to the toaster frame or to other stationary parts of the toaster, depending upon the particular toaster design involved. Thus far the toaster does not differ from known toasters of either the manual or automatic types. In certain automatic toasters there may also be provided a thermosensitive element which operates to release the slice carriage upon the attainment by the element of a predetermined temperature, so that the carriage may be returned or moved to its non-toasting position.

As an example of this type of element I have shown a strip or "skid" such as the bimetal element 13 which is located between two of the guide wires 12 on one side of the path of travel of the bread carriage. This bimetal is suitably supported as by an angular bracket 14 secured as at 15 to the base of the frame, and welded or otherwise suitably secured as at 16 to the bimetal. Upon heating, the bimetal will flex in a direction away from the bread or other material being toasted, and this flexing is used to operate a switch, latch, or other control for the heaters or for the carriage. I have shown a switch including a resilient arm 17 which carries contact 18 and a cylindrical ceramic insulating roller 19 at its upper end. This resilient arm is supported together with, but insulated from, a stationary arm 20 which carries a contact 21. Both arms are suitably supported and insulated as by a bracket 22 which is shown as secured to the bottom of the toaster frame. Obviously, when the bimetal 13 flexes, its lower end will strike against insulating roller 19 thereby moving the resilient arm 17 and its contact 18 away from the stationary contact 21, breaking the circuit through the contacts. As explained above this operation controls either the toaster heater or the bread carriage, or it may control the operation of both the heater and the carriage.

My invention will be described in connection with non-automatic or automatic toasters of the character set forth above. It includes a slice shifter and holder which may be used either singly, to press a slice against a member such as the thermosensitive elements 13, or in opposed pairs, to center a slice on the carriage between heaters. I have shown the single form, which includes a C-shaped heavy wire frame 23 which is pivotally secured to the carriage as by pivot holes 24 in brackets 25, shown as riveted or otherwise secured at 26 underneath the carriage. As shown, this pivoted wire frame extends to one side of the carriage, and a pusher wire 27, also generally of C-shape is brazed, welded, or otherwise firmly secured to the pivoted wire frame as at 28. The upper portion of the pusher wire loop extends inside of the guide wires 12, and the weight of the combined pivoted frame and pusher wire loop forming the positioner biases the positioner to rotate away from the slice receiving portion of the toaster by gravity. In Figs. 2 and 3 of the drawings, this direction of rotation is clockwise. The distance of rotation in this direction is limited by the fact that the horizontal portion 29 of the pusher wire 27 rests slidably against the inside of the guide wires 12 as shown in Fig. 2. This can be called the inactive or rest position.

With the above arrangement it should be clear that the carriage can move up and down, carrying with it the positioner, and that the positioner will not obstruct the insertion or withdrawal of a slice from the toaster.

When the carriage is moved downwardly toward the toasting position of Fig. 3, the positioner should come into action. For this purpose I provide an actuator in the form of resilient arm or stop 30. This stop, shown as a leaf spring, is suitably fixed with relation to the toaster frame or base as by being riveted to a bracket 31 which in turn is supported from the bottom 6 of the toaster frame. When the positioner moves downwardly along with the carriage, a portion of the positioner strikes against the free end of the resilient arm 30, and the positioner is thereupon rotated toward the slice receiving space in the toaster, in a direction shown as counterclockwise in the drawings. This can be called the active position. Because of the resilient nature of the arm 30, the positioner will be moved toward the slice and will move the slice until resistance to further movement is encountered. Thereupon, the positioner will remain stationary in its pivot and the resilient arm 30 will give.

This arrangement permits proper positioning of the slice in the toaster in spite of variations in thickness of the bread or other material being toasted. In an automatic toaster utilizing a thermosensitive control element such as I have described, this resilient stop also insures that the slice will be pressed firmly against the control element or other equivalent mechanism. Where a pair of positioners are used to center a slice of bread on a carrier, the resilient stop serves only to prevent overtravel of the positioner after the positioner has engaged the stop and while the carriage is moving to its full downward position. Opposed pairs of positioners can be used to prevent buckling of thin slices being toasted.

When the carriage is moved upwardly, either manually or automatically, the positioner moves with it and with the slice, so that there is no jamming of the mechanism in case the positioner should stick to the toasted material. Assuming that there is no sticking, as soon as the positioner disengages from the resilient stop it will fall back to the position shown in Fig. 2 and ride upwardly along the guide wires 12 while the carriage returns to its non-toasting position. If the positioner should stick to the slice, a slight pull on the slice will be sufficient to loosen the pusher wire and allow the positioner to drop into the position of Fig. 2 after the toast has been raised to its position above the toaster slot.

Although I have shown a carriage with outturned ears 32, bearing holes 33 through which the guide wires extend, it is obvious that other arrangements of carriage and guide wires could be used without departing from my invention. The form shown is convenient because the guide wires can be used to guide not only the slice to be toasted but also the slice carriage itself. Carriage guides independent of the slice guides might be used, in which case the slice guides might move along with the carriage. As a matter of fact, if a pair of opposed positioners is used, each positioner might be considered as a bread slice guide.

As will be evident from the foregoing description, certain aspects of my invention are not limited to the particular details of construction of the example illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

In a toaster having a frame, a slice carriage vertically slidable in the frame between a lower toasting position and an upper non-toasting position, and vertical stationary slice guide wires in the frame alongside the path of movement of the carriage, that improvement which comprises a slice positioner pivotally carried by the sliding carriage, a horizontally extending portion on said positioner, the weight of the positioner normally causing said horizontal portion to rest slidably against the guide wires when the carriage is in its upper position, and an actuator for pivoting said positioner and moving said horizontal portion away from the guide wires and toward a slice carried by said carriage when the carriage is moved toward its lower position, said actuator comprising a resilient stop member in the toaster frame in the path of movement of a part of said positioner and yieldingly engageable therewith when the carriage is moved to its lower position.

JOHN H. PALMER.

REFERENCES CITED

The following references are of record in the file of this patent:

UNITED STATES PATENTS

| Number | Name | Date |
|---|---|---|
| 1,229,128 | Parkhurst | June 5, 1917 |
| 1,480,084 | Lamb | Jan. 8, 1924 |
| 1,963,409 | Johnson | June 19, 1934 |
| 2,355,153 | Gomersall | Aug. 8, 1944 |